(12) United States Patent
Song et al.

(10) Patent No.: US 7,338,677 B2
(45) Date of Patent: Mar. 4, 2008

(54) METHODS FOR MANUFACTURING COATED CONFECTIONARY PRODUCTS

(75) Inventors: Joo Hae Song, Chicago, IL (US); Donald Arthur Seielstad, Frankfort, IL (US); Enrique Valdez, Oak Lawn, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 240 days.

(21) Appl. No.: 11/024,214

(22) Filed: Dec. 22, 2004

(65) Prior Publication Data

US 2005/0163886 A1    Jul. 28, 2005

Related U.S. Application Data

(63) Continuation-in-part of application No. 10/218,991, filed on Aug. 14, 2002.

(51) Int. Cl.
    *A23G 3/30*    (2006.01)
(52) U.S. Cl. .................. 426/5; 426/302; 426/303; 426/305; 426/548
(58) Field of Classification Search ............ 426/3, 426/302, 303, 305, 548, 5, 103, 4, 6
    See application file for complete search history.

(56) References Cited

U.S. PATENT DOCUMENTS

| | | | |
|---|---|---|---|
| 3,477,858 A | 11/1969 | Wells et al. | |
| 3,556,814 A | 1/1971 | Whitman et al. | |
| 3,671,266 A | 6/1972 | Cooper et al. | |
| 4,105,801 A | 8/1978 | Dogliotti | |
| 4,146,653 A * | 3/1979 | Mader et al. | 427/2.19 |
| 4,146,656 A | 3/1979 | Kinugawa et al. | |
| 4,235,458 A | 11/1980 | Austin et al. | |
| 4,293,570 A | 10/1981 | Vadasz | |
| 4,328,249 A | 5/1982 | Mackay et al. | |
| 4,828,845 A | 5/1989 | Zamudio-Tena et al. | |
| 4,840,797 A | 6/1989 | Boursier | |
| 4,937,080 A | 6/1990 | Appelgren et al. | |
| 5,270,061 A | 12/1993 | Reed et al. | |
| 5,314,701 A | 5/1994 | Mentink et al. | |
| 5,376,389 A | 12/1994 | Reed et al. | |
| 5,958,471 A | 9/1999 | Schwarz et al. | |
| 5,965,181 A | 10/1999 | Barkalow et al. | |
| 6,365,203 B2 | 4/2002 | Degady et al. | |
| 6,558,692 B2 | 5/2003 | Ream et al. | |
| 6,627,233 B1 | 9/2003 | Wolf et al. | |
| 6,696,044 B2 | 2/2004 | Luo et al. | |

FOREIGN PATENT DOCUMENTS

| | | |
|---|---|---|
| EP | 0 670 680 | 9/1995 |
| EP | 1057414 | 6/2000 |
| GB | 1247979 | 9/1971 |
| WO | WO8101100 | 4/1981 |
| WO | WO 01/56398 | 8/2001 |
| WO | WO2004008877 | 1/2004 |
| WO | WO2004016093 | 2/2004 |
| WO | WO2006071343 | 7/2006 |

* cited by examiner

*Primary Examiner*—Keith Hendricks
*Assistant Examiner*—Vera Stulii
(74) *Attorney, Agent, or Firm*—Bell, Boyd & Lloyd LLP

(57) ABSTRACT

Methods for manufacturing coated confectionary or chewing gum products are provided. The method of manufacturing a confectionary product comprises the steps of providing a confectionary center, heating at least one polyol to the polyol's melting point to produce a molten polyol, spraying the molten polyol through at least one atomizing spray nozzle, and applying a plurality of layers to the confectionary center to form a final coating. The plurality of layers includes at least one layer of the molten polyol.

18 Claims, 2 Drawing Sheets

METHODS FOR MANUFACTURING COATED CONFECTIONARY PRODUCTS

PRIORITY CLAIM

This application is a continuation-in-part of and claims the benefit of U.S. patent application Ser. No. 10/218,991 filed on Aug. 14, 2002, the entire disclosure of which is hereby incorporated.

CROSS REFERENCE TO RELATED APPLICATIONS

This application is related to the following commonly owned co-pending patent applications: "Methods for Manufacturing Coated Confectionary Products," filed on Aug. 14, 2002 having U.S. patent application Ser. No. 10/218,991.

BACKGROUND OF THE INVENTION

The present invention relates generally to confectionary products having an outer coating.

There are numerous types of confectionary products for consumers. One such confectionary product is chewing gum. Chewing gum generally consists of a water insoluble portion and a water soluble portion including sweeteners.

In a similar vein, it is known to provide a variety of different types of chewing gum. For example, it is known in creating chewing gum, and other confectionary products, to coat the chewing gum with an outer coating. The coating can provide an initial sweetness or other desirable organoleptic property to the consumer. Further, the coating can provide a crunching sensation when chewed by the consumer. A number of such chewing gum products are known.

Initially, in creating coated chewing gums, sugar syrups or similar solutions were used to create the coating. Solutions, which may be in a liquid state at high temperature, contain a water component wherein the solute is dissolved or suspended. The coating is often achieved by spraying the hot solution onto the base confectionary item, spreading the syrup to distribute material onto all confectionery items, then cooling and drying the syrup solution to afford a solid coating.

Despite their widespread popularity in the confectionary industry, conventional solution-based coatings, such as sugar syrups, are in some ways disadvantageous. For example, an adequately thick coating typically cannot be achieved with a single spray application. Therefore, repeated cycles of spraying, distributing and drying are required to achieve a final coating that is sufficiently thick. The repeated spraying and drying process is complicated by the fact that drying each application typically requires the introduction of hot, dry air to remove moisture before spraying the next coat. This is due to the fact that solutions-based coatings have a moisture content that provides for the liquid property of the solution. This liquid characteristic is necessary for the coating solution to be sprayed or otherwise conveniently applied to the confectionary item. Of course, however, the moisture component must be removed after application in order for the coating to be transformed to a solid state.

These repeated cycles of spraying, distributing and drying are time-consuming and require specialized equipment. Indeed, elimination of the drying steps, for example, the use of hot, dry air, could reduce capital and energy expenditures associated with the equipment necessary to the drying process. Additionally, time and energy could be saved if a confectionary coating could be developed that requires fewer (and preferably, only one) spray applications in order to achieve an adequate coating thickness.

In recent years, polyol solutions have been used for coating confections, including chewing gums, as an alternative to sugar-based solution coatings. Xylitol and other polyol solutions, however, are similar to conventional sugar solutions in that they require repeated cycles of application and drying to remove the inherent water component contained therein.

Current problems associated with applying a molten polyol coating to confectionary centers such as chewing gums include the long-term adhesion of molten polyol layer to gum pellets, deforming of the gum centers upon spraying of the molten polyol on bare pellets, long manufacturing process times, rough final surface appearance of the coating and loss of shape of corners in square and rectangular shaped pellets after the molten polyol is applied.

There is therefore a need for an improved method of applying coating to chewing gums and other confections. More specifically, it would be beneficial if polyols and other coating substances or syrups could be formulated and applied to chewing gums and other confections such that their use as confectionary coatings could be achieved in a more expeditious and cost-effective manner.

SUMMARY OF THE INVENTION

The present invention provides an improved method for coating confectionary products including chewing gum.

To this end, in an embodiment, the present invention provides for a method of manufacturing a confectionary product comprising the steps of providing a confectionary center, heating at least one polyol to the polyol's melting point to produce a molten polyol, spraying the molten polyol through at least one atomizing spray nozzle, and applying a plurality of layers to the confectionary center to form a final coating. The plurality of layers includes at least one layer of the molten polyol.

In an embodiment, at least one layer of molten polyol or a syrup composition may be applied to the confectionary center prior to spraying.

In an embodiment, the step of applying the layer of the syrup composition includes mixing with, spraying upon or pouring over the confectionary center.

In an embodiment, each of the layers are dried before another layer is applied.

In an embodiment, the confectionary center includes a chewing gum center.

In an embodiment, the molten polyol is selected from the group consisting of xylitol, maltitol, sorbitol, erythritol, mannitol, isomalt, lactitol and combinations thereof.

In an embodiment, the molten polyol includes a non-polyol ingredient.

In an embodiment, the polyol, when it is heated, forms a molten composition that includes less than 5% by weight water.

In an embodiment, at least one atomizing spray nozzle is selected from the group consisting of an internal air mixing spray nozzle, an external air mixing spray nozzle and combinations thereof.

In an embodiment, the nozzle includes a cone-shaped tip.

In an embodiment, the nozzle includes a fan-shaped tip.

In an embodiment, the nozzle includes an atomizing air flow rate ranging between 0.5 liters/min/nozzle and 5.0 liters/min/nozzle.

In an embodiment, the molten polyol is sprayed at a rate ranging between 0.04% coating applied/minute to 2.00% coating applied/minute.

In an embodiment, the temperature of the molten polyol is maintained between about its melting point (° C.) and 140% of its melting point (° C.) during the spraying of the molten polyol through the nozzle.

In an embodiment, the plurality of layers of the molten polyol forms the entire coating having a smooth surface over the confectionary center.

In an embodiment, the plurality of layers of the molten polyol and the syrup composition form the final coating having a smooth surface over the confectionary center.

In a further embodiment, the plurality of layers of the molten polyol and the syrup composition form the final coating with more than 50% of the coating mass resulting from the molten polyol composition.

In a further embodiment, the plurality of layers of the molten polyol and the syrup composition form the final coating with more than 10% of the coating mass resulting from the molten polyol composition.

In a further embodiment, the method of manufacturing a coated chewing gum comprises the steps of providing a chewing gum center having a shape, heating at least one polyol to the polyol's melting point to produce a molten polyol, spraying the molten polyol through at least one internal air mixing atomizing spray nozzle, and applying a plurality of layers to the chewing gum center to form a final coating. The plurality of layers includes at least one layer of the molten polyol and at least another layer of a syrup composition. The coated chewing gum has a similar shape to the shape of the chewing gum center.

In a further embodiment, the molten polyol may be applied prior to the application of the syrup composition.

In a further embodiment, the syrup composition may be applied prior to the application of the molten polyol.

In a further embodiment, the molten polyol may be applied concomitantly with the syrup composition.

In a further embodiment, the sequences of applying the syrup composition and the molten polyol may be repeated any number of times in order to build up the mass of coating material as is desired.

In a further embodiment, applying the syrup composition, a dry charge, or molten polyol may be performed in any sequence with any combination of mass applications, cooling, spreading, and drying in order to achieve the desired finish product results.

In still a further embodiment, the method of manufacturing a coated chewing gum comprises the steps of providing a gum center including a water insoluble gum base, a water soluble portion and one or more flavoring agents. At least one layer is applied to the chewing gum center to form an initial coating, wherein each of the layers includes a syrup composition. Each layer is dried prior to applying another layer of the syrup composition. At least one polyol is heated to the polyol's melting point to produce a molten polyol, wherein the molten polyol comprises less than 5 percent by weight water. The molten polyol is sprayed through at least one internal air mixing atomizing spray nozzle. At least one layer of the molten polyol is applied to the chewing gum center having the initial coating and dried. At least one additional layer is applied to form a final coating, wherein the additional layer is selected from the group consisting of the first syrup composition, the molten polyol, a second syrup composition, and a flavoring.

In yet another embodiment, the method of manufacturing a coated chewing gum comprises the steps of providing a chewing gum center including a water insoluble gum base, a water soluble portion and one or more flavoring agents, heating xylitol to the xylitol's melting point to produce a molten xylitol, wherein the molten xylitol comprises less than 5 percent by weight water, spraying the molten xylitol through at least one internal air mixing atomizing spray nozzle, and applying a plurality of coats to the chewing gum center. At least one of the plurality of coats includes the molten xylitol and at least another one of the plurality of coats includes a syrup composition.

In a further embodiment, the method of manufacturing a coated confectionary product comprises the steps of providing a confectionary center, heating at least one polyol to the polyol's melting point to produce a molten polyol, spraying the molten polyol through at least one atomizing spray nozzle, and applying a plurality of layers to the confectionary center to form a final coating, the plurality of layers including at least one layer of molten polyol. The method of manufacturing the coated confectionary product comprises a manufacturing time of less than about 2 hours.

In another embodiment, the method of manufacturing the coated confectionary product comprises a manufacturing time of less than about 1.5 hours.

In another embodiment, the method of manufacturing the coated confectionary product comprises a manufacturing time of less than about 1 hour.

In various embodiments, the present invention provides for compositions that are produced by the various methods embodied herein.

It is an advantage of the present invention to provide improved coatings for confectionary products as well as improved methods for forming such coatings.

Yet another advantage of the present invention is to provide improved methods for manufacturing chewing gum products.

Still another advantage of the present invention is to provide coating substances that can be sprayed onto confectionary items.

Moreover, an advantage of the present invention is to provide improved methods for applying coatings to an edible product including a center.

Yet another advantage of the present invention is to provide coatings and methods for applying same that require fewer processing steps.

Still another advantage of the present invention is to provide improved coated products including chewing gum.

Another advantage of the present invention is to provide a method for building up a sufficient coating on a confectionary product involving shorter process times.

Yet another advantage of the present invention is to provide a method for coating a confectionary product that maintains a coated shape similar to the shape of the confectionary center.

Additional features and advantages of the present invention are described in, and will be apparent from, the following Detailed Description of the Invention and the Figures.

DETAILED DESCRIPTION OF THE INVENTION

Figure 1:
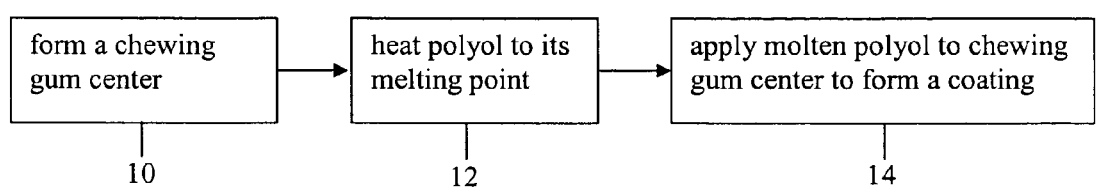
FIG. 1 illustrates a schematic view of the process steps of an embodiment of the present invention.

The present invention provides for improved coated confectionary products as well as methods for coating confectionary products. Although in the preferred embodiments set forth below the confectionary product is chewing gum, the present invention is not limited to chewing gum. The present invention can be used to coat foodstuffs and most preferably confectionary products, including chewing gum.

In general, xylitol, maltitol, and isomaltitol take several hours (3-5) to coat to 30-35% weight gain. Hard coating using sorbitol can be 6-8 hours, and hard coating by sugar panning protocols can be 8-12 hours. The most time consuming component of the coating process is associated with the drying of water used to apply and distribute the coating solids in onto the confectionery centers in the hard panning process.

Significant process cycle-time savings can be realized through the reduction of water content in the coating syrups, providing adequate coating solids distribution can be maintained. In practice, pan coating processes have increased syrup solids contents to 70-80° Brix and 60-80° C. to provide sufficient moisture to maintain the polyol in solution/suspension, yet maintain the minimum amount of water necessary to spray, distribute, and smooth the syrup on the confectionery centers. In spite of this, 70-98% of the overall process coating times are used for drying of associated moisture from the coatings being applied to the confectionery centers.

Application of molten or fused confectionery coatings according to the present invention substantially reduces process cycle times through elimination of current water drying times in syrup-based processes. Additional benefits of the present invention include good adhesion to confectionery cores, adequate uniformity of distribution to cover all pieces equally, dissipation of both latent heat and sensible heat loads, and adequate binding, spreading, and filling of surface imperfections to afford a generally smooth surface and a coated shell with good integrity and homogeneity.

The present invention also provides reduced exposure to moisture through development of hard coatings by using a molten coating protocol. This is beneficial during the production of dry or solid pharmaceutical dosage forms which comprise ingredients that are often sensitive to degradation through contact with moisture or water during processing.

The present invention generally provides for the use of molten polyols and other molten substances or syrups to coat confectionary products, and more specifically, chewing gum. In the case of chewing gum, for example, the molten polyol coating is typically applied to chewing gum centers. Pursuant to the present invention, time, energy, and equipment costs are reduced due to the reduction and/or elimination of the need to perform repeated cycles of spraying and drying of the coating syrup. In this regard, the molten polyol coatings of the present invention can be applied in single spray application without the need for drying involving the introduction of hot, dry air. However, more than one coating application can be used.

The molten polyols of the present invention can reduce or eliminate the need for repeated cycles of spraying and drying because the molten polyols do not possess the high water content found in conventional non-molten, syrup-based coating substances. In this regard, the polyols featured herein can be liquefied by the introduction of sufficient heat levels, rather than by the introduction of moisture. In other words, when sufficiently heated, a given polyol will melt and will remain in a molten state until it is allowed to cool to a temperature below its melting point. Polyol, as used herein, can broadly refer to a single polyol, blend of polyols, or polyol mixture.

For pure polyols, the melting point can be considered its published value. For example, xylitol has a published melting point of 92-95° C., sorbitol has a published value of 99-101° C., maltitol has a published value of 144-147° C. It should be appreciated that compositions arising from blends of polyols, or fusion of impure polyols or polyols with other additives, can sometimes have dramatically altered melting points above or below the published value of the major component. Preferred heating ranges for the molten polyol of an embodiment of the present invention would be about 100%-140% of the polyol's melting point (° C.). More preferably, the range would be about 100%-130% of the polyol's melting point (° C.). Most preferably, the range would be about 100%-120% of the polyol's melting point (° C.).

The molten polyols of the present invention are to be applied, preferably by atomizing spray application, to the gum center while the polyols are in a molten state. Thereafter, the coated gum is allowed to cool, a process that enables the polyol to transform from a molten state back to a solid state.

The presently preferred polyol for use in the present invention is xylitol. However, other polyols can be used with the present invention. For example, other such suitable polyols include, but are not limited to, maltitol, sorbitol, erythritol, mannitol, isomalt, lactitol and combinations thereof. Xylitol is preferred because it possesses a relatively low melting point and is relatively less sticky as it cools. Sorbitol is also a preferred polyol due to its reduced cost as compared to xylitol.

The molten polyol coatings of the present invention may include non-polyol ingredients which are commonly used in sugar and sugarless coatings. For example, sugar products such as sucrose, fructose, maltose, glucose, dextrose, and trehalose or combinations thereof could be applied from a molten state to provide a hard-coated sugar confectionery or other center/core. The specific ingredients and their usage levels will vary greatly according to the intentions for the formulation.

The use of one or more fillers (e.g., titanium dioxide, talc, calcium carbonate, silicon dioxide) in the present invention is especially advantageous. In this regard, these inorganic materials aid the coating process by giving the molten polyol coatings a smoother finish, especially when using molten polyols having a higher melting point, such as maltitol. Furthermore, these inorganic fillers enhanced the ease with which molten sorbitol could be used, and in many instances substantially increased the crunchiness of the product. These fillers also appear to facilitate crystallization of the applied polyol once the molten material adheres to the centers being coated. Without adding an inorganic filler to molten sorbitol, the coating is excessively sticky, causing coating problems, e.g., the pellets may stick together. Likewise, without inorganic filler added to molten maltitol, the spray exiting the nozzle is unsuitable for coating smooth pellets. Moreover, the use of non-polyol can reduce the spider-web structures created by spraying maltitol.

As noted above, a suitable final molten polyol coating can typically be achieved with comparatively few spray applications. If desired, a number of short spray sessions can be performed. The final thickness of the polyol coating will vary greatly according to the preference of the practitioner of the present invention. For example, it may be desirable to have a thin coating or, on the other hand, it may be desirable to have a thick coating. In an embodiment, the coating is such that it exceeds 50% by weight of the total product. However, a thinner coating can be used if desired.

Various polyols may not be identical in their physical and chemical characteristics. The variability among the polyols therefore allows one to blend two or more different molten polyols prior to application. Similarly, it may be desirable to build-up multiple coating layers using single or blended polyols for the individual coating layers.

Molten polyol coatings can result in a finished product that, when compared to conventional non-molten coatings, is rougher in appearance. As used herein, the term "conventional non-molten coatings," and like terms, are intended to broadly refer to any coating substance or syrup that is not in a molten state, but dissolved or dispersed in an aqueous or other solvent-based media, and applied to a given confectionary item. A non-molten coating substance or syrup can include, but is not limited to, sugar syrups, polyol syrups, other solutions, suspensions, pastes, and gels.

It should be noted that xylitol or sorbitol, whose melting points are below 100° C. (point where water boils) can be made less viscous by the addition of a small amount of water. Other polyols melt at temperatures above 100° C., and may also be made less viscous with addition of small amounts of water. However, water will evaporate rapidly when these polyols are heated and maintained at temperatures above 100° C. to maintain a homogeneous fluid.

Glycerin behaves similar to water. By introducing a small amount of glycerin, the temperature necessary to achieve a fluid state can be reduced. Glycerin's boiling point is 125.5° C. Thus, a small amount of glycerin can be used to melt erythritol (melting point of 121.5° C.) at a lower temperature than the crystal melting temperature. By adding small amounts of water or glycerin, the viscosity of the molten polyol is lower and allows for easier spraying or atomization.

Because molten polyol coatings can appear and feel rough to the consumer, it may be desirable to first coat the product with one or more molten polyol coatings, and then complete the coating process by using one or more conventional non-molten coatings in order to provide a final product with a smooth surface.

In an alternative embodiment, it is also possible to produce a coated confectionary containing the molten polyol, potentially with high intensity sweeteners, flavor, color, filler, binder, or film forming agents having a rough texture or appearance. For example, a frosted, flavored or sweetened coating could be applied in an embodiment of the present invention to confectionary products to provide an alternative surface finish and means of introducing a high-initial-impact product.

Additionally, it may be desirable to initially establish at least one coating layer using at least one conventional non-molten coating, over which at least one molten polyol coating of the present invention may be applied. Similarly, depending on the desired outcome, it may be preferable to employ alternating layers of molten polyol coatings and conventional non-molten coatings. Therefore the molten polyol coatings described herein can be utilized as the sole coating or can be utilized in combination with one or more other coating layers that comprise any type of conventional non-molten coating.

The molten polyol coatings of the present invention can be melted by methods known in the art. In an embodiment, the polyol is liquefied by heating a composition that includes 5% or less water. By way of example and not limitation, the coating materials can be melted by using a hotmelt apparatus such as the Robatech Hotmelt Unit. However, other means can be used.

Preferably, a jacketed atomizing spray nozzle is used. The jacketed atomizing sprayer will maintain the temperature of the molten polymer through the tip of the nozzle. Then, atomization will assist in cooling down the temperature of the molten polyol droplets before they hit the centers (pellets). After the coating material is transformed into a molten state, it can be applied to gum centers using processes, techniques, and equipment suited for the application of conventional non-molten coatings.

Finely atomized molten spray droplets produce very fine molten droplets which remain tacky throughout the transit distance and time between the nozzle and the surface of the pellets. These droplets bind or attach to the surface of the coated centers and smear or spread slightly. Throughout the spray duration, repeated passes of pellets through the spray application leads to very uniform, yet finely roughened, buildup of polyol onto the tumbling bed of coated centers. Because the process generates a fine mist or fog of molten polyol targeted to the rotating bed of pellets, the droplets are still tacky and stick to the centers, rather than becoming a dry dust and being exhausted from the pan without ever sticking to the centers. This results in high coating efficiencies. For example, 70-100% or typically 90-95% of applied molten spray ends up attached to the pellets, and not coating the pan or venting out the dust collector.

As noted previously, it may be desirable to provide chewing gum products that have different coating layers comprising molten polyols and conventional non-molten coatings. In this regard, both such coating types can be applied using methods known in the art, such as spraying the coating materials onto the gum pellets. Spraying can be alternately started and stopped to allow layers of coating to dry onto the surface of the pieces. Forced air and dry powder additionally may be used to speed the drying process. The various parameters of the operation (spray time, dry time, air temperature, tumbling speed and others) will vary greatly from one system to another and may well vary within a coating batch and from batch to batch. They will be set based on the skill and experience of the developer and operator.

Typical coating equipment usable in the present invention will include any suitable apparatus normally used for this purpose, with the exception of the spray nozzles, which must be atomizing nozzles to spray the molten polyol. Simple systems may comprise conventional motor-driven coating pans with manually controlled spray nozzles and drying air. However, more sophisticated automated systems including, for example, Driam and Dumoulin Coaters, GS perforated coating pans, Latini, Thomas Coating side-ventilated pans and others similar systems are preferred.

The inventors of the present invention also see use for this invention with other sugars that do not burn when heated to their melting point, e.g. trehalose, dextrose, etc.

In addition to the coatings of the present invention applied by spraying, optionally flavors may be separately sprayed onto the pieces during the coating process to provide a flavored coating. If used, this flavor may constitute from about 0.01 to 3% of the total coating with levels of 0.5 to 2% being preferred.

Optionally a final polishing coat may be applied to the pieces after the polyol coatings have been applied. The polishing coat may use a wax, such as carnauba wax, or shellac. It may also include fillers such as talc and colors. The polishing coat is typically 0.01 to 0.5% of the total coating.

FIG. 1 illustrates a schematic view of the process steps of an embodiment of the present invention. As illustrated in a first step 10 a center is formed. In a second step 12 a polyol is heated to its melting point. In the third step 14 the polyol is applied to the gum center.

Figure 2:
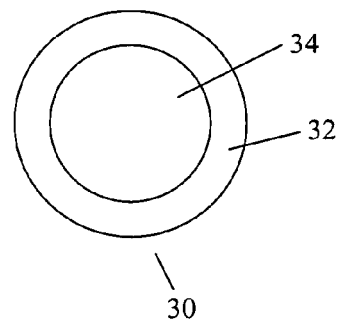
FIG. 2 illustrates a cross-sectional view of an embodiment of a product of the present invention.

As noted above, the present invention can be used to create coated chewing gum. FIG. 2 illustrates such a product 30. The product 30 includes a coating 32 and gum center 34. A variety of chewing gum formulations can be used to create the chewing gum center 34. Chewing gum generally consists of a water insoluble gum base, a water soluble portion, and flavors.

The insoluble gum base generally comprises elastomers, resins, fats and oils, softeners, and inorganic fillers. The gum base may or may not include wax. The insoluble gum base can constitute approximately 5 to about 95 percent, by weight, of the chewing gum, more commonly, the gum base comprises 10 to about 50 percent of the gum, and in some preferred embodiments, 20 to about 35 percent, by weight, of the chewing gum.

In an embodiment, the chewing gum of the present invention contains about 20 to about 60 weight percent synthetic elastomer, 0 to about 30 weight percent natural elastomer, about 5 to about 55 weight percent elastomer plasticizer, about 4 to about 35 weight percent filler, about 5 to about 35 weight percent softener, and optional minor amounts (about one percent or less) of miscellaneous ingredients such as colorants, antioxidants, etc.

Synthetic elastomers may include, but are not limited to, polyisobutylene with a GPC weight average molecular weight of about 10,000 to about 95,000, isobutylene-isoprene copolymer having styrene-butadiene ratios of about 1:3 to about 3:1, polyvinyl acetate having a GPC weight average molecular weight of about 2,000 to about 90,000, polyisoprene, polyethylene, vinyl acetate-vinyl laurate copolymer having vinyl laurate content of about 5 to about 50 percent by weight of the copolymer, and combinations thereof.

Preferred ranges are, for polyisobutylene, 50,000 to 80,000 GPC weight average molecular weight, for styrene-butadiene, for polyvinyl acetate, 10,000 to 65,000 GPC weight average molecular weight with the higher molecular weight polyvinyl acetates typically used in bubble gum base, and for vinyl acetate-vinyl laurate, vinyl laurate content of 10-45 percent.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum, as discussed below. Preferred natural elastomers include jelutong, chicle, sorva and massaranduba balata.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum, as discussed below. Preferred natural elastomers include jelutong, chicle, sorva and massaranduba balata.

Elastomer plasticizers may include, but are not limited to, natural rosin esters, often called estergums, such as glycerol esters of partially hydrogenated rosin, glycerol esters polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing the preferred elastomer plasticizers will also vary depending on the specific application, and on the type of elastomer which is used.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof.

Colorants and whiteners may include FD&C-type dyes and lakes, fruit and vegetable extracts, titanium dioxide, and combinations thereof.

The base may or may not include wax. An example of a wax-free gum base is disclosed in U.S. Pat. No. 5,286,500, the disclosure of which is incorporated herein by reference.

In addition to a water insoluble gum base portion, a typical chewing gum composition includes a water soluble bulk portion and one or more flavoring agents. The water soluble portion can include bulk sweeteners, high intensity sweeteners, flavoring agents, softeners, emulsifiers, colors, acidulants, fillers, antioxidants, and other components that provide desired attributes.

The softeners, which are also known as plasticizers and plasticizing agents, generally constitute between approximately 0.5 to about 15% by weight of the chewing gum. The softeners may, in addition to including caprenin, include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners include both sugar and sugarless components. Bulk sweeteners typically constitute 5 to about 95% by weight of the chewing gum, more typically, 20 to 80% by weight, and more commonly, 30 to 60% by weight of the gum.

Sugar sweeteners generally include saccharide-containing components commonly known in the chewing gum art, including, but not limited to, sucrose, dextrose, maltose, dextrin, dried invert sugar, fructose, levulose, galactose, corn syrup solids, and the like, alone or in combination.

Sorbitol can be used as a sugarless sweetener. Additionally, sugarless sweeteners can include, but are not limited to, other sugar alcohols such as mannitol, xylitol, hydrogenated starch hydrolysates, maltitol, lactitol, and the like, alone or in combination.

High intensity artificial sweeteners can also be used in combination with the above. Preferred sweeteners include, but are not limited to sucralose, aspartame, aspartame derivatives and conjugates, such as neotame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extension may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8%. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Example of low caloric bulking agents include: polydextrose; Raftilose, Raftilin; Fructooligosaccharides (NutraFlora); Palatinose oligosaccharide; Guar Gum Hydrolysate (Sun Fiber); or indigestible dextrin (Fibersol). However, other low calorie bulking agents can be used.

A variety of flavoring agents can be used. The flavor can be used in amounts of approximately 0.1 to about 15 weight percent of the gum, and preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

A variety of processes for manufacturing chewing gum center are possible as is known in the art.

Chewing gum is generally manufactured by sequentially adding the various chewing gum ingredients to commercially available mixers known in the art. After the ingredients have been thoroughly mixed, the chewing gum mass is discharged from the mixer and shaped into the desired form, such as by rolling into sheets and cutting into sticks, extruding into chunks, or casting into pellets.

Generally, the ingredients are mixed by first melting the gum base and adding it to the running mixer. The gum base may alternatively be melted in the mixer. Color and emulsifiers can be added at this time, along with syrup and a portion of the bulking agent. Further portions of the bulking agent may then be added to the mixer. A flavoring agent is typically added with the final portion of the bulking agent. The entire mixing procedure typically takes from five to fifteen minutes, but longer mixing times may sometimes be required. Those skilled in the art will recognize that many variations of the above described procedures may be followed.

Once formed, the chewing gum center can be coated. In conventional panning, the coating is initially present as a liquid syrup which contains from about 30% to about 80% or 85% of the coating ingredients previously described herein, and from about 15% or 20% to about 70% of a solvent such as water. In general, the coating process is carried out in conventional panning equipment. Sugarless gum center tablets to be coated are placed into the panning equipment to form a moving mass.

In the conventional panning process, the material or syrup which will eventually form the coating is applied or distributed over the gum center tablets. Flavors may be added before, during and after applying the syrup to the gum centers. Once the coating has dried to form a hard surface, additional syrup additions can be made to produce a plurality of coatings or multiple layers of coating.

In the conventional panning procedure, syrup is added to the gum center tablets at a temperature of from about 100° F. to about 240° F. Preferably, the syrup temperature is from about 140° F. to about 200° F. Most preferably, the syrup temperature should be kept constant throughout the process in order to prevent the polyol in the syrup from crystallizing. The syrup may be mixed with, sprayed upon, poured over, or added to the gum center tablets in any way known to those skilled in the art.

In some instances, a soft coating is formed by adding a powder coating after a liquid coating. The powder coating may include natural carbohydrate gum hydrolysates, maltodextrin, gelatin, cellulose derivatives, starches, modified starches, sugars, sugar alcohols, natural carbohydrate gums and fillers like talc and calcium carbonate.

Each component of the coating on the gum center may be applied in a single layer or in a plurality of layers. In general, a plurality of layers is obtained by applying single coats, allowing the layers to dry, and then repeating the process. The amount of solids added by each coating step depends chiefly on the concentration of the coating syrup. Any number of coats may be applied to the gum center tablet. Preferably, no more than about 75 coats are applied to the gum center. More preferably, less than about 60 coats are applied and most preferably, about 30 to 60 coats are applied. In any event, the present invention contemplates applying an amount of molten polyol and syrup sufficient to yield a coated chewing gum product containing about 10% to about 65% coating. Preferably, the final product will contain at least 30% coating.

Those skilled in the art will recognize that in order to obtain a plurality of coated layers, a plurality of premeasured aliquots of coating syrup may be applied to the gum center. It is contemplated, however, that the volume of aliquots of syrup applied to the gum center may vary throughout the coating procedure.

In the conventional coating process, once a coating of syrup is applied to the gum center, the wet centers are tumbled briefly with no air flow to uniformly distribute syrup across all pellets of the bed, and then drying is done on the wet syrup in an inert medium. A preferred drying medium comprises air. Preferably, forced drying air contacts the wet syrup coating in a temperature range of from about 70° F. to about 110° F. More preferably, the drying air is in the temperature range of from about 80° F. to about 100° F. The invention also contemplates that the drying air possess a relative humidity of less than about 15 percent. Preferably, the relative humidity of the drying air used between syrup applications is less than about 8 percent.

The drying air may be passed over and admixed with the syrup coated gum centers in any way commonly known in the art. Preferably, the drying air is blown over and around the syrup coated gum centers at a flow rate, for large scale operations, of about 2800 cubic feet per minute. If lower quantities of material are being processed, or if smaller equipment is used, lower flow rates would be used. If a flavor is applied after a syrup coating has been dried, the present invention contemplates drying the flavor with or without the use of a drying medium.

Certain methods for manufacturing coated confectionary products according to the present invention will be described below. In one embodiment, the method of manufacturing a confectionary product comprises the steps of providing a confectionary center, heating at least one polyol to the polyol's melting point to produce a molten polyol, spraying the molten polyol through at least one atomizing spray nozzle, and applying a plurality of layers to the confectionary center to form a final coating. The plurality of layers includes at least one layer of the molten polyol. At least one layer of molten polyol or a syrup composition may be applied to the confectionary center prior to spraying. An additional flavor layer may be added to the confectionary center. It should be appreciated that any suitable arrangement of molten polyol, syrup composition and flavor layers may be applied.

In an embodiment, the plurality of layers of the molten polyol form the entire coating having a smooth surface over the confectionary center. In another embodiment, the plurality of layers of the molten polyol and the syrup composition form the final coating with more than 50% of the coating mass resulting from the molten polyol composition. In further embodiment, the plurality of layers of the molten polyol and the syrup composition form the final coating with more than 10% of the coating mass resulting from the molten polyol composition.

Replacement of some of the coating mass by molten polyol (by reducing the number of syrup addition cycles) can be done to provide identical surface finish, weight, appearance, texture, and organoleptic properties. This typically encompasses 5-65% of the coating mass to be applied via molten polyol spray application in lieu of conventional coating syrup, more preferably 10-45%, and most preferably 15-40%. In these cases, use of conventional coating syrups are often used to provide good binding of coating layers to the chewing gum core, or to provide a smooth, hard coated finish typical of current commercial products available on the market. It should be appreciated that new coating texture, non-conventional coating appearance, and textures not typically associated with commercial chewing gum products commercially available can be obtained if no conventional coating syrup is used in conjunction with molten polyol spray applications, or if molten polyol sprays are used for a majority of the coating process, or as finishing stages of a conventional coating process.

In another embodiment, the confectionary center is a chewing gum center or pellet including a water insoluble gum base, a water soluble portion and one or more flavoring agents. In an alternative embodiment, the step of applying the layer of the syrup composition to the confectionary center includes the step of mixing with, spraying upon, pouring over or any other suitable method of applying the syrup composition to the confectionary center. Each layer of molten polyol and syrup may be dried before another layer is applied.

In one embodiment, the end of the atomizing spray nozzle may include a fluid cap and/or an air cap. The fluid cap orifice diameter regulates, limits and controls the maximum flow rate of molten liquid spraying from nozzle. For example, fluid cap #60100DF from Spraying Systems was used during testing because it provided the largest diameter liquid orifice and the opportunity for the greatest molten spray rate.

In an alternative embodiment, the air cap available for these nozzles may be provided in any suitable configuration such as internal air mixing and external air mixing. The internal mixing of atomizing air and molten liquid provide a finer particle or molten droplet, is more reliable, is less likely to beard, and is more resistant to clogging or freezing of the molten xylitol.

The temperature of the hot air used for atomization of molten xylitol can range between 100° C. and 250° C. The atomizing air pressure may generally be set between 0.5 bar to 7.0 bar. The atomizing air flow rates through the nozzle can range between 10 liters/min/nozzle and 240 liters/min/nozzle. Preferably, the atomizing air pressure between 1.0-5.0 bar and atomizing air flow rates of 60-120 liters/min/nozzle at 160-230° C.

In an embodiment, the molten polyol application rate can be given in a coating rate value of % coating applied/minute. This percentage is given as coating weight/confectionary center weight. For example, the preferred molten polyol application rate is 0.04%/minute to 2.00%/minute. This corresponds to nozzle rates of 25 g/minute/nozzle to 1250 g/minute/nozzle and spray rates of 0.5 kg/min to 25 kg/minute. More preferably, the molten polyol application rate is 0.08%/minute to 1.28%/minute. This corresponds to nozzle rates of 50 g/minute/nozzle to 800 g/minute/nozzle and spray rates of 1.0 kg/min to 16.0 kg/minute. Most preferably, the molten polyol application rate is 0.24%/minute to 0.64%/minute. This corresponds to nozzle rates of 150 g/minute/nozzle to 400 g/minute/nozzle and spray rates of 3.0 kg/min to 8.0 kg/minute.

The lower ends of these ranges can be used for coating soft, thermally sensitive centers due to the high heat load or cooling demand of the latent and sensible heat being applied via the molten polyol. Coating of chewing gum centers which may soften, deform, or melt due to the heat conducted via the applied coating could be addressed using very cold process air, or precooling gum centers prior to coating with molten polyols.

The upper ends of these application rate ranges may be used for coating of hard candy centers and other confectionary materials which may be better able to tolerate greater heat loads. Alternatively, higher application rates of molten polyols may be used for much shorter duration and intervals which may allows adequate cooling between applications.

Atomizing air spray rates can vary greatly, and are strongly influenced by the molten material spray rate, material viscosity and surface tension, and geometry of the nozzle tip and spray pattern. It should be appreciated that spray nozzle parameters of various embodiments of the present invention (molten spray rate, atomizing air, nozzle tip, and temperature) can be modified to provide uniform distribution of fine molten polyol droplets which remain molten and tacky during the transit from the nozzle to the pellet surface.

Other preferred operating conditions can utilize higher or lower molten xylitol spray rates with concomitant increases or decreases in atomizing air flow rates in order to maintain a uniform and finely atomized mist of xylitol droplets. Atomized air flow rates set too low for a given molten xylitol delivery rate will result in incomplete atomization, spitting, and macroscopic dripping of molten xylitol from the nozzle tip. Atomized air rates set too high will result in a dusty xylitol mist which can cool and solidify prior to contacting the confectionery centers, and resulting in low process yields. Atomization air temperatures are set based upon molten and atomizing air spray rates, and are adjusted to minimize freezing of xylitol on the nozzle tip and maintain a the finely atomized xylitol in a molten state until it has the opportunity to attach and solidify on the centers being coated. This combination of air and molten polyol affords good atomization and fine mist of molten droplets which coats the pellets well.

Flat fan-shaped sprays, cone-shaped sprays or any suitable shaped sprays of atomized molten xylitol may be used to coat the pellets. Preferably, cone nozzles may be used because they produce less bearding, for example, solid xylitol solidifying upon leaving nozzle tip. Cone nozzles may provide more localized and intense spray regions with less spray in between nozzles, however both types of nozzles can be used successfully to provide good uniformity of coating among all pellets within a pellet bed. Spray rates, bed speed, and atomization air flow can all be modified to make sure all pellets in the bed are exposed to uniform spraying of xylitol.

In one embodiment, the method of manufacturing a coated chewing gum comprises the steps of providing a chewing gum center or pellet having a shape, heating at least one polyol to the polyol's melting point to produce a molten polyol, spraying the molten polyol through at least one internal air mixing atomizing spray nozzle, and applying a plurality of layers to the chewing gum center to form a final coating. The plurality of layers includes at least one layer of the molten polyol and at least another layer of a syrup composition. The coated chewing gum has a similar shape to the shape of the chewing gum center. For example, the final coated chewing gum may have coated corners that are maintained from the shape of the corners of the original chewing gum pellet. In an alternative embodiment, externally atomized spray nozzles may also be used. Similar results are possible, and a wider control over fan shape is feasible using these.

In an embodiment, the molten polyol may be applied prior to the application of the syrup composition. The syrup composition may also be applied prior to the application of the molten polyol. Alternatively, the molten polyol may be applied concomitantly or as a blend with the syrup composition. In addition, a dry charge may be added during or between any layer application. The dry charge may be any relevant substance added in a dry or powdered form. The sequences of applying the syrup composition and molten polyol may be repeated any number of times in order to build up the mass of coating material as is desired. Applying the syrup composition, a dry charge, or molten polyol may be performed in any sequence with any combination of mass applications, cooling, spreading, and drying in order to accomplish the desired finish product results.

In one embodiment, the method of manufacturing a coated chewing gum comprises the steps of providing a gum center or pellet including a water insoluble gum base, a water soluble portion and one or more flavoring agents. At least one layer or more of a syrup composition is applied to the chewing gum center to form an initial coating. Each layer is dried prior to applying another layer of the syrup composition. At least one polyol is heated to the polyol's melting point to produce a molten polyol, wherein the molten polyol comprises less than 5 percent by weight water. The molten polyol is sprayed through at least one internal air mixing atomizing spray nozzle and at least one layer of the molten polyol is applied to the chewing gum center having the initial coating. Each layer of the molten polyol is dried. Furthermore, at least one additional layer is applied to the gum center or pellet to form a final coating. The additional layer may be comprised of the first syrup composition, the molten polyol, a second syrup composition, and a flavoring or a combination thereof.

In one embodiment, the method of manufacturing a coated confectionary product comprises the steps of providing a confectionary center, heating at least one polyol to the polyol's melting point to produce a molten polyol, spraying the molten polyol through at least one atomizing spray nozzle, and applying a plurality of layers to the confectionary center to form a final coating, the plurality of layers including at least one layer of molten polyol. The method of manufacturing the coated confectionary product comprises a manufacturing time of less than about 2 hours. Preferably, the method of manufacturing the coated confectionary product comprises a manufacturing time of less than about 1.5 hours. More preferably, the method of manufacturing the coated confectionary product comprises a manufacturing time of less than about 1 hour.

If the typical process time associated with the target weight gain of the pellet center is considered, overall process time savings using different embodiments of the present invention could be measured in various ways. For example, during a 3 hour process, use of molten sprayed mass for some of the coating material could produce the identical product in a process time savings of 30 minutes, 60 minutes, 90 minutes, etc. (i.e. −5%, 10%, 24%, 37% times savings). Alternatively, the present invention could produce a better quality product in a comparable 3 hour process time.

By way of example and not limitation examples of the present invention will now be given.

In Examples 1-6 below, a Robatech model Concept 8 hotmelt unit was used to melt the xylitol for the purpose of applying the xylitol as a coating. The xylitol was heated to 200° F. (+/−5° F.) and held less than 24 hours before use. The Robatech unit was outfitted with an atomizing spray head, which is heated to prevent clogging. Batch weights were 200 pounds of uncoated gum centers and the coater used was a conventional Driam 1200 coater.

In addition to coating with molten polyols, various xylitol and maltitol syrups were used for coating. These syrups were also applied by spraying, but were sprayed with the standard spray equipment mounted on the Driam coater.

The weight of the uncoated gum centers was 1.0 gram and the target weight of finished pellets was 1.52 grams, including final polishing. Syrup brix was measured with a refractometer.

In Examples 7 and 8 below, different equipment was utilized. A Robatech model Concept 8 hotmelt unit was used to melt the xylitol for the purpose of applying the xylitol as a coating. The xylitol was heated to 200° F. (+/−5° F.) and held less than 24 hours before use. The coater used was a conventional 500 lb. Latini pan coater outfitted with a Thomas Engineering spray arm with heated atomizing nozzles. The polyol was constantly recirculated through the spray arm, which has a jacket that is heated with 220° F. water. The air used to dry the syrup-coated gum centers was between 12% and 15% relative humidity, and introduced to the Latini coater at 1800-2000 CFM.

In Examples 7 and 8 below, a small amount of titanium dioxide (<1%) was added to the molten xylitol in an effort to make a more finely atomized spray and provide smoother finished pellets.

EXAMPLE 1

In this example, gum pellets were coated with molten xylitol. A pure xylitol was first melted. After spraying for 6 to 7 minutes, the coating on the pellets was 60% complete with a total pellet weight of approximately 1.3 g. The pellets were allowed to cool while the coater continued to tumble for about 2 minutes. The coated gum pellets appeared rough.

EXAMPLE 2

In this example, molten-xylitol-coated gum pellets were additionally coated with a xylitol syrup (high tahla content) with conventional panning. Molten-xylitol-coated pellets as described in Example 1 were coated to a weight of 1.52 grams with a xylitol syrup having the formula of

| | |
|---|---|
| 18% | Water |
| 63% | Xylitol |
| 18% | Gum Tahla Solution (60% water/40% Tahla) |
| 0.8% | Titanium Dioxide |

(Brix 70-72)

The final coated product appeared rough. The total coating time was one hour fifteen minutes. Coating with syrup consisted of several cycles alternating between syrup application, pausing, and drying.

EXAMPLE 3

In this example, molten-xylitol-coated gum pellets were additionally coated with a xylitol syrup (reduced tahla content). Molten-xylitol-coated pellets as described in Example 1 were coated with a xylitol syrup having the formula of

| | |
|---|---|
| 26% | Water |
| 66% | Xylitol |
| 7% | Gum Tahla Solution (60% water/40% Tahla) |
| 0.5% | Titanium Dioxide |

(Brix 68-70)

The final coated product appeared rough. Additionally, application of the thinner xylitol syrup caused partial washing-off of the molten-xylitol pre-coating. The total coating time was one hour thirty minutes. Coating with syrup consisted of several cycles alternating between syrup application, pausing, and drying.

EXAMPLE 4

In this example, gum pellets coated with molten xylitol were coated with maltitol syrup. Molten-xylitol-coated pellets as described in Example 1 were coated with a maltitol syrup having the formula of

| | |
|---|---|
| 18% | Water |
| 63% | Maltitol |
| 18% | Gum Tahla Solution (60% water/40% Tahla) |
| 0.8% | Titanium Dioxide |

(Brix 70-72)

The maltitol syrup did not fill all the cavities on the pellet surfaces. The total coating time was one hour and thirty minutes. Coating with syrup consisted of several cycles alternating between syrup application, pausing, and drying.

EXAMPLE 5

In this example, gum pellets coated with molten xylitol were coated with an alternative maltitol syrup formulation. Molten-xylitol coated pellets as described in Example 1 were coated with a maltitol syrup having the formula of

| | |
|---|---|
| 26% | Water |
| 66% | Maltitol |
| 7% | Gum Tahla Solution (60% water/40% Tahla) |
| 0.5% | Titanium Dioxide |

(Brix 68-70)

Coating with syrup consisted of several cycles alternating between syrup application, pausing, and drying. The maltitol syrup washed away the xylitol coating and the trial was not successful.

EXAMPLE 6

In this example, gum pellets were coated with a maltitol syrup, followed by molten xylitol, followed by a second maltitol syrup. Gum pellets were first coated with a thin coat (0.02-0.03 grams) with a maltitol syrup having the formula of

| | |
|---|---|
| 18% | Water |
| 63% | Maltitol |
| 18% | Gum Tahla Solution (60% water/40% Tahla) |
| 0.8% | Titanium Dioxide |

(Brix 70-72)

followed by a 50% coating (0.25 grams) of molten xylitol. A final coating of maltitol syrups alternating between the following was applied:

1)

| | |
|---|---|
| 18% | Water |
| 63% | Maltitol |
| 18% | Gum Tahla Solution (60% water/40% Tahla) |
| 0.8% | Titanium Dioxide |

(Brix 70-72)

2)

| | |
|---|---|
| 26% | Water |
| 66% | Maltitol |
| 7% | Gum Tahla Solution (60% water/40% Tahla) |
| 0.5% | Titanium Dioxide |

(Brix 68-70)

The final product, with a weight of 1.52 grams, appeared acceptable. The total coating time was one hours and twenty-five minutes. Coating with syrup consisted of several cycles alternating between syrup application, pausing, and drying.

EXAMPLE 7

In this example, gum pellets were coated in a Latini coater first with molten xylitol followed by coating with xylitol syrup. Pellets pre-coated to 1.3 grams (0.3 grams of molten xylitol coating) were then coated with a xylitol syrup having the formula of:

| | |
|---|---|
| 18% | Water |
| 63% | Xylitol |
| 18% | Gum Tahla Solution (60% water/40% Tahla) |
| 0.8% | Titanium Dioxide |

(Brix 70-72)

Coating with syrup consisted of several cycles alternating between syrup application, pausing, and drying. The total coating time was one hour and fifteen minutes. The final coated pellets, with a weight of 1.52 grams, appeared acceptable, and the addition of titanium dioxide to the molten xylitol resulted in the smoothest pellet surface yet.

EXAMPLE 8

In this example, gum pellets were coated sequentially with xylitol syrup by conventional panning, molten xylitol, and xylitol syrup. Gum pellets were coated with a xylitol syrup having the formula of

| | |
|---|---|
| 18% | Water |
| 63% | Xylitol |
| 18% | Gum Tahla Solution (60% water/40% Tahla) |
| 0.8% | Titanium Dioxide |

(Brix 70-72)

The gum centers were pre-coated with syrup for 15-20 minutes, until they reached a weight of 1.05 to 1.1 grams. Coating consisted of several cycles alternating between syrup application, pausing, and drying.

Molten xylitol was then applied for 10 minutes, until the gum centers reached a weight of 1.35 grams to 1.4 grams.

Thereafter, a final coating was applied using a reduced viscosity xylitol syrup having the formula of

| | |
|---|---|
| 18% | Water |
| 63% | Xylitol |
| 18% | Gum Tahla Solution (60% water/40% Tahla) |
| 0.8% | Titanium Dioxide |

(Brix 68-70)

Coating with syrup consisted of several cycles alternating between syrup application, pausing, and drying. This final coat took approximately 45 minutes, alternating between syrup application, pausing, and drying. The total coating time was one hour fifteen minutes. The final coated pellets appeared very smooth, but many had rounded corners due to the low viscosity xylitol syrup.

EXAMPLE 9

In this example, spraying gum centers with molten maltitol was attempted. Unlike molten xylitol, molten maltitol spray produced spider web-like structures rather than a mist of spray, probably due to the high melting point of the maltitol. When the molten maltitol solution exited from the nozzle, it immediately solidified and turned into cotton candy-like threads, therefore, not adhering to the centers. This problem was alleviated by adding an inorganic filler (titanium dioxide) to the molten maltitol.

In Examples 10-19 below, startup procedures were comprised of opening hand-valve steam lines to melting tank, pump jacket, and strainer jacket, loading 100-150 kg xylitol powder into a steam-jacketed melt tank for heating, and setting of activation of heaters and heat-trace elements within a recirculating system to 110° C. After 60-90 minutes, process line valves were opened and the recirculating pump was set to 20-40% capacity to begin recirculating molten xylitol through the process lines and back into the holding tank. Additional xylitol powder, for example 50 kg loads, was carefully added to the jacketed tank while the molten material was recirculated, and 15-30 minutes were allowed to largely melt this floating solid mass prior to subsequent 50 kg xylitol powder additions. After approximately 250-350 kg of xylitol was loaded and largely melted (generally 2 hours) the pellet coating process commenced. This total xylitol quantity was sufficient for filling process lines and providing a surplus of material sufficient to coat a 1250 kg batch at up to 35-40% molten xylitol pellet coating by weight.

Additionally, once the molten reservoir was established, additional replenishments of 50 kg xylitol powder could be added on approximately 30-minute intervals with recirculation, even during molten spray processing and operations. Indeed, once recirculating xylitol was established, process line temperatures could be dropped to 100-105° C. and the pump slowed to 5-10% speed to maintain process line steady-state operations overnight or during production downtimes.

Experimental batches of peppermint xylitol pellet gum and menthol eucalyptus xylitol pellet gum were coated during these trials. Batches were finished using conventional factory protocols of smoothing and waxing. Prior to pellet coating, the molten system operation, nozzle performance, stability, and spray reproducibility outside of the Driam 2000 pan were characterized. Cone-shaped and fan-shaped internal mixing atomizing spray nozzles were evaluated. Flow rate, nozzle-to-nozzle delivery, reproducibility, and spray pattern uniformity were determined for both spray nozzle caps. Titanium dioxide (0.5-0.9% use level) was used as an adjuvant within the molten xylitol to improve droplet size and uniformity, surface tack, crystallization, and color for the duration of the coating trials. A rotameter and adjustable diaphragm pressure regulator were installed inline with the house air supply to the Driam 2000 to control the atomization airflow rate used by the molten spray nozzles. This provided an accurate and controllable method of setting the atomizing air flow to the molten spray nozzles.

Twenty atomizing air spray nozzles comprised the molten spray bar installed in the conventional 2-metric ton Driam 2000 used for coating the gum pellets. Spacing on the bar was 5-6 inches between nozzles. Nozzles were oriented horizontally at approximately the centerline of the pan and were located at approximately the vertical midpoint of pan. In the Driam 2000, the nozzle tip to pellet bed spacing was preferably 10-14 inches, although spraying could be done as close as 6-8 inches and as far as 16-18 inches from pellet bed surface. It should be appreciated that any suitable horizontal and vertical placement of nozzles may be used. Also, any suitable angle of the nozzles during spraying ranging from perpendicular to pellet bed to almost parallel with pellet bed can be used.

As the cylindrical pan rotated, the pellet bed generally filled the pan on one side of the cylindrical. Spraying was done at the top of this tumbling bed of confectionery centers, for example, as the pellets were lifted by friction and the vanes in the pan. The surfaces of the pellets in the pellet bed were exposed to the molten xylitol spray as the pellets cascaded down to the bottom of the cylindrical pan where they were pulled back under the cascading pellet bed. It should be appreciated that spraying of molten polyol can be accomplished at any feasible distance, any feasible angle, and at any axial location within the horizontal rotating cylinder of the coating pan. Nozzles used were ¼-inch JAU automatic air actuated atomizing spray nozzles from Spraying Systems Co. in Wheaton, Ill.

In addition to a rotating, perforated coating pan, other types of pans can be used for in the coating process. For example, another embodiment includes using solid, non-perforated closed pans typically used in sugar coating applications. It should also be appreciated that side-vented perforated pans typically associated with pharmaceutical film-coating process, continuous coating pans, moving belts, conveying webs, or fluidized bed columns can be used in alternative embodiments of the present invention.

Drizzle spraying of molten xylitol on pellets with little or no atomization of molten liquid generally resulted in poor uniformity, poor surface appearance of finished pellets, excessive heat transfer to gum centers which results in deforming of gum pellets, and poor smearing/spreading of xylitol on pellet surfaces between pellets. This protocol, however, works well for conventional syrup-based coating processes, as is common in the practice of the art, where the entire bed is dosed or drizzled with liquid syrup, the tumbling of pellets results in spreading, smoothing, and good distribution of coating materials across all pellets, and finally the syrup is dried through the circulation of conditioned air throughout the pan.

Pellet samples from more than one batch were of sufficient quality, in terms of appearance, including corner retention and finished smoothness, to be suitable for consumer test samples. Reduction of overall coating times of approximately 40%, from over 3 hours to 2 hours, were demonstrated while maintaining comparable finished pellet appearance with typical control samples. Experience gained through ongoing process optimization resulted in a final batch with the best overall pellet appearance in the shortest coating time of 1 hour and 58 minutes.

Cone-shaped tips, while not providing as fine and dispersed atomized xylitol spray pattern as do fan-shaped caps, displayed a very low tendency to clog or beard during molten operation. The cone nozzles were used for molten spray in the first set of molten batches, and the fan nozzles used in the final set of molten batches.

Current monitoring of molten flow and spray rates was possible through the use of an inline MicroMotion mass flow meter between the molten pump and spray bar. During standby operation, 100% molten flow was recirculated back into the holding tank through the flow meter and spray bar at any chosen flow rate set point. During molten spray operation, the return valve at the tank was closed and 100% molten flow through the MicroMotion flow meter was delivered through the spray nozzles into the rotating pan. The MicroMotion flow meter thus provided an accurate determination of molten mass delivered to the pellets, regardless of flow rate. Process set points were satisfied when the integrated mass was delivered through the nozzles to the pellets and was independent of molten flow rate. This device provided steady, stable and accurate molten flow throughout all testing and process operations.

Individual nozzle stability, repeatability, and accuracy were evaluated by collecting molten xylitol sprays of 30-60 seconds from each nozzle into closed containers. Containers were weighed, and results were used to determine averages, deviations from average, and repeatability for molten xylitol flows between 300 g/min/nozzle to 1600 g/min/nozzle. Data from the individual spray nozzles was obtained for several combinations of molten flow rate and atomizing air flow rate.

It appeared that under extended molten spray operation, the observed spray rate increased with increasing operation while the control point for molten delivery was based upon a constant pump speed. The increase in molten xylitol delivered over time did not result in a process control concern, as the MicroMotion mass flow meter displayed the instantaneous molten spray rate, and continually integrated the values to provide the actual quantity of xylitol delivered. During pellet coating operations, process control variables included nominal molten spray rate and target molten dose required. Molten spray rate changes, which appear to be within 10% of nominal, were integrated into total xylitol delivered and molten spray was terminated upon delivery of the targeted xylitol dose.

Generally, the trials comprised applying layers of syrup compositions, the molten polyol and flavors to the gum center or pellet during twelve phases followed by an optional pause and drying cycle within each phase. It should be appreciated that any suitable number of layer applications, pause and drying cycles may be used during each phase and any suitable number of phases may be used to form a final coating on the confectionary center. Furthermore, any suitable method of drying, including direct or reverse air flow, may be used after any of the coating applications.

Molten xylitol can be applied to gum centers or pellets using a variety of suitable coating protocols, for example, such as: (a) single continuous dose early in pellet coating sequence; (b) multiple applications of smaller molten xylitol doses to permit some cooling and smoothing of pellets between high temperature molten xylitol applications; (c) intermittent dosings of syrup and molten xylitol with various combinations of material addition, pauses, drying cycles, drying conditions, air volumes and air temperatures to effect surface appearance, smoothing, drying and cooling; (d) improved incorporation of molten materials using lower Brix, higher tahla syrups dosed at higher than typical levels following atomized molten spray applications with continuous spraying of molten material concurrently with conventional syrup dosing protocol; (e) protocol of "molten-syrup-pause-dry" with incorporation of all coating materials, good intermixing between layers and good smoothing; (f) continuous application of lower spray rate molten xylitol concurrently with conventional syrup application protocols of "dose-distribute-dry" cycles, and (g) concurrent application of molten xylitol atomized spray during conventional syrup dosing protocols, followed by conventional spreading or drying cycles. It should be appreciated that the present invention should not be limited to these protocols and other suitable protocols and sequences for applying a molten polyol to a confectionary center may be used as well. Examples of several protocols used in these experiments along with further variations in the phases of the protocols are discussed below:

EXAMPLE 10

The following program was used:

| | PHASE | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Repetitions | 3 | 1 | 1 | 1 | 2 | 1 | 2 | 2 | 3 | 1 | 1 | 1 |
| Syrup Dose (kg) | 18 | 25 | 25 | 25 | 25 | 36 | 36 | 25 | 30 | 17 | 12 | 9 |
| Molten Dose (kg) | | 30 | 50 | | | 40 | 40 | | | | | |
| Flavor Dosing | | | | | Yes | | | Yes | | | | |
| Pause Time (min.) | | 0.2 | 0.2 | 0.2 | | 0.2 | 0.2 | | 0.5 | 0.5 | 0.7 | 0.7 |
| Dry Time (min.) | 3.0 | 3.5 | 3.5 | 4.0 | 5.0 | 4.0 | 2.5 | 3.0 | 4.2 | 3.5 | 3.0 | 3.0 |
| Air Temp. (° C.) | 25 | 20 | 20 | 25 | 25 | 25 | 25 | 25 | 24 | 23 | 23 | 23 |
| RPM | 5 | 7 | 7 | 7 | 7 | 7 | 7 | 7 | 7 | 8 | 8 | 8 |
| Syrup Conc. (Brix) | 73 | 73 | 73 | 73 | 73 | 73 | 69 | 69 | 69 | 69 | 69 | 69 |

| Ingredient | Syrup #1 | Syrup #2 |
|---|---|---|
| Xylitol | 450 kg | 468 kg |
| Gum Tahla (40%) | 160 kg | 53 kg |
| Titanium Dioxide | 3.5 kg | 5.0 kg |
| Water | 35 kg | 123 kg |

| | Solids (kg) | Experimental | Original |
|---|---|---|---|
| Syrup #1 | 157.0 | 32.1% | 52.9% |
| Syrup #2 | 172.5 | 35.2% | 47.1% |
| Molten | 160.0 | 32.7% | |
| Total | 489.5 | 100.0% | |

Molten cycles were set for "syrup-pause-dry-molten-dry." "Dry" was reverse air; "molten" was direct air. Molten spray time was independent of required dry time. Pause times of 0.1 min were added; premolten dry of 1.0 min; postmolten dry of 0.5 min. Flavor: 8.2 kg flavor were added during phase 5 & 8.

By means of demonstration, all remaining examples represent peppermint-flavored chewing gum pellets of final target weight approximately 1.50 g and comprising 34% coating mass. All examples cited utilized pure molten xylitol at a setpoint temperature of 110° C.

The overall process time was 2 hours and 2 minutes. The following were also used in this trial:
  Typical grossing syrup was used for Syrup #1
  (12.4% gum tahla, 74° Brix)
  Typical smoothing syrup was used for Syrup #2
  (4.8% gum tahla, 69° Brix)
  Cone-shaped internal mix atomizing air spray nozzles
  Atomizing air flow rate=110 liters/min/nozzle at 225° C.
  Molten xylitol spray rate=800 g/min/nozzle The two single large doses of molten xylitol was split into two applications prior to addition of the 1st Flavor and three applications prior to the addition of the 2nd Flavor. Three cycles of Syrup #1 were used to build a minimal adhesion layer in Phase 1. A Syrup-Dry-Molten sequencing was used. The initial molten spray rate of 26 kg/min for phases was greater than expected due to many molten controls remaining set in manual following cleanout and start-up. The value dropped to 13 kg/min during Phase 4. The pellets were heavy going into the 2nd Flavor (1.373 g/pc.). Good thickness was achieved in 30-count gauge. Corners were lost during the 2nd Flavor, and smoothing was incomplete following the final 7 cycles of smoothing syrup application.

EXAMPLE 11

The overall process time was 2 hours and 6 minutes. The following were used in this trial:
  Typical grossing syrup was used for Syrup #1
  (12.4% gum tahla, 75-76° Brix)
  Typical smoothing syrup was used for Syrup #2
  (4.8% gum tahla, 70° Brix)
  Cone-shaped internal mix atomizing air spray nozzles
  Atomizing air flow rate=110 liters/min/nozzle at 225° C.
  Molten xylitol spray rate=600 g/min/nozzle The protocol chosen was a modification of the process of Example 10 and targeted to improve molten and syrup delivery, redistribute materials to achieve Phase target weights, and to produce a pellet with improved smoothness following the 2nd Flavor. An additional cycle was added during Phase 2 in an attempt to improve corners. An additional syrup cycle was added during Phase 5 to improve smoothness. The molten xylitol was reduced from 50 kg to 40 kg in Phase 4. A cycle was removed from Phase 8, and molten xylitol doses were dropped from 40 kg to 30 kg in Phase 7 and 10 kg in Phase 8 to better match interim target pellet weights. Smoothing Phase-Cycles of 5-1-1-1-wax were used to improve smoothness. The corners were still lost during the 2nd Flavor, and only minor improvements were achieved in corner retention. The finished pellet appearance seemed slightly rougher than the finished pellets of Example 10.

EXAMPLE 12

The overall process time was 2 hours and 23 minutes. The following were used in this trial:
  Increased gum tahla syrup was used for Syrup #1
  (16.8% gum tahla, 73° Brix)
  Typical smoothing syrup was used for Syrup #2
  (4.8% gum tahla, 71° Brix)
  Cone-shaped internal mix atomizing air spray nozzles
  Atomizing air flow rate=145 liters/min/nozzle at 225° C.
  Molten xylitol spray rate=300 g/min/nozzle, 600 g/min/nozzle Multiple phases incorporated alternating syrup-molten cycles. A higher tahla concentration syrup, slower drum speed, and improved drying during early phases were used to improve maintenance of corners. A lower molten rate of 300 g/min/nozzle was used in early phases, while a higher molten rate of 600 g/min/nozzle was used in later phases. Increasing number of cycles resulted in a longer overall process time. However, the pellet finish was ultimately smoother than earlier runs, although smoothness was achieved at the expense of the corners. Small quantities of molten xylitol applied early in the process during Phases 2-4 may have contributed to a partial loss of corners. Splotchy pellets were observed following Phase 3 with considerable peeling and picking of coating material observed during this phase. Peeling of pellet coating was attributed to the high force of atomizing air directed directly onto pellet bed during early phases. Ultimately, reducing the atomizing air flow to 90 L/min/nozzle or lower was determined to improve overall pellet appearance. Very good pellet smoothing was achieved. Pellet target weights well matched with planned values.

EXAMPLE 13

The overall process time was 2 hours and 40 minutes. The following were used in this trial:
Increased gum tahla syrup was used for Syrup #1 (16.8% gum tahla, 74-75° Brix)
Typical smoothing syrup was used for Syrup #2 (4.8% gum tahla, 71° Brix)
Cone-shaped internal mix atomizing air spray nozzles
Atomizing air flow rate=145 liters/min/nozzle at 225° C.
Molten xylitol spray rate=630 g/min/nozzle This process involved the refinement of the previous three examples. However, an increased molten dosing was focused between flavor phases while trying to minimize the quantity used before the 1st Flavor in order to maintain corners better. Reverse drying air was used to reduce pellet-pellet bed friction and to "fluff" bed, preserve corners and improve smoothing. Atomizing air was initially set to 2900 L/min in hopes of producing a finer molten mist particle size. It was discovered prior to the first molten spray, however, that the high velocity atomizing air was responsible for the peeling/flaking of the early Tahla syrup layers. Consequently, this parameter needed to be set to a low value. The atomizing air flow rate was dropped to 80 L/min/nozzle at 225° C. for the remainder of the batch, and the molten xylitol spray rate was dropped from 630 g/min/nozzle to 300 g/min/nozzle. Shifting of the molten xylitol spray dosing to between flavor phases resulted in underweight pellets at both 1st and 2nd Flavor phases. Consequently, 8 smoothing cycles at Phase 11 were necessary to build mass and thickness to appropriate target values.

EXAMPLE 14

The overall process time was 2 hours and 15 minutes. The following were used in this trial:
Typical grossing syrup was used for Syrup #1 (12.4% gum tahla, 74.5° Brix)
Typical smoothing syrup was used for Syrup #2 (4.8% gum tahla, 72° Brix)
Fan-shaped internal mix atomizing air spray nozzles
Atomizing air flow rate=90 liters/min/nozzle at 200° C.
Molten xylitol spray rate=300 g/min/nozzle Loss of corners was attributed to erosion during flavor additions and insufficient gum tahla prior to the addition of the 2nd Flavor. An increased of Syrup #1 was used until the beginning of the 2nd Flavor. The molten xylitol spray rate was decreased to 6 kg/min to improve pellet smoothness. The syrup used to apply flavors was decreased from 25 kg/shot to 20 kg/shot. Standard syrups for grossing (#1; 74.5° Brix) and smoothing/finishing (#2; 72° Brix) were used for remainder of trials. Syrup additions were used exclusively prior to 1st Flavor. After the 1st Flavor, 2×20 kg molten xylitol doses were added. Phases in between the 1st and 2nd Flavor utilize 3×25 kg Syrup #1 and 3×25 kg molten xylitol cycles at 300 g/min/nozzle low molten rates. There were light pellet weights at the 1st and 2nd Flavor phase, but prominent corners remained after the 2nd Flavor phase. Additional smoothing cycles (6 total) were added in Phase 10 with some increase in pause times. However, insufficient syrup was used to wash and fill in surface. An improved smoothing should result from 28-30 kg doses instead of 25 kg doses during future runs. Very good pellets with some surface roughness were formed in 2 hours and 15 minutes.

EXAMPLE 15

The overall process time was 2 hours and 15 minutes. The following were used in this trial:
Menthol chewing gum pellet centers
Typical grossing syrup was used for Syrup #1 (12.4% gum tahla, 75.5° Brix)
Typical smoothing syrup was used for Syrup #2 (4.8% gum tahla, 71.5° Brix)
Fan-shaped internal mix atomizing air spray nozzles
Atomizing air flow rate=90-100 liters/min/nozzle at 200° C.
Molten xylitol spray rate=320 g/min/nozzle This trials was intended largely as a refinement of Example 14 to try maintaining corners using Syrup #1 up to the 2nd Flavor while improving the smoothing protocol following the 2nd Flavor. A better overall appearance was achieved, however there was a considerable mass build-up through 10 cycles prior to 1st Flavor and 9 cycles for smoothing after 2nd Flavor. Molten xylitol dosing was minimized for the current batch—50 kg in 2 cycles prior to the 1st Flavor and 75 kg in 3 cycles prior to the 2nd Flavor. Five cycles were used in Phase 10 for smoothing. More material remaining on pellet corners meant slower buildup on bulk surfaces. Consequently, phase target weights must be targeted upwards in mass in order to achieve target pellet weight and thickness.

EXAMPLE 16

The overall process time was 2 hours and 10 minutes. The following were used in this trial:
Menthol chewing gum pellet centers
Typical grossing syrup was used for Syrup #1 (12.4% gum tahla, 74° Brix)
Typical smoothing syrup was used for Syrup #2 (4.8% gum tahla, 71.5° Brix)
Fan-shaped internal mix atomizing air spray nozzles
Atomizing air flow rate=90-100 liters/min/nozzle at 200° C.
Molten xylitol spray rate=320 g/min/nozzle This trial was a modification of Examples 14 and 15 to achieve higher pellet weight targets. Some adjustments were made to accommodate smoothing in later phases. Reduction of dry times was based upon experience with Example 15. Pellets were somewhat light prior to the 1st Flavor. The pellet texture was mixed after the 2nd Flavor with some of the pellets being rough and some of the pellets being smooth.

EXAMPLE 17

The overall process time was 2 hours and 12 minutes. The following were used in this trial:
Menthol chewing gum pellet centers
Typical grossing syrup was used for Syrup #1
(12.4% gum tahla, 75° Brix)
Typical smoothing syrup was used for Syrup #2
(4.8% gum tahla, 71.5-72° Brix)
Fan-shaped internal mix atomizing air spray nozzles
Atomizing air flow rate=90-100 liters/min/nozzle at 200° C.

Molten xylitol spray rate=Incrementally increased over three adjustments from 320 g/min/nozzle to 430 g/min/nozzle.

Smoother pellets resulted from these changes, however pellet corners remained weak or rounded. This experiment was an attempt to improve finished smoothness. Six smoothing cycles were used in Phase 9. The molten spray rate was initially low and then increased during the process to reduce overall process time. Molten xylitol spray rate increased from 320 g/min/nozzle and 90 L/min/nozzle atomization air at 200° C. during Phase 5 to 400 g/min/nozzle and 90 L/min/nozzle atomization air (also at 200° C. and 90 liters/min/nozzle. Final pellets were comparable in appearance to those in Examples 14-16.

EXAMPLE 18

The overall process time was 2 hours and 10 minutes. The following were used in this trial:
Menthol chewing gum pellet centers
Typical grossing syrup was used for Syrup #1
(12.4% gum tahla, 75.5° Brix)
Typical smoothing syrup was used for Syrup #2
(4.8% gum tahla, 71.5° Brix)
Fan-shaped internal mix atomizing air spray nozzles
Atomizing air flow rate=90-100 liters/min/nozzle at 200° C.
Molten xylitol spray rate was slowed back to 320 g/min/nozzle.

The original plan added small quantities of molten xylitol during early phases and added larger quantities of molten xylitol between flavor phases. A very conservative 20% molten dosing was targeted for this trial. An increased duration spray was found to be necessary in order to increase bed temperature enough to observe shortened syrup dry times. Only 3 cycles were used to smooth the pellet surfaces following the 2nd Flavor, which appeared to be inadequate.

A satisfactory conclusion was determined as a result of these trials; typically 4-5 smoothing phases are required following completion of the final molten spray in order to reproduce the final pellet appearance and improve crunch and shelf-life of the product form. Effective pellet coating was accomplished in reasonable overall process coating times of approximately 2 hours when 20-45% of the mass of the pellet coating typically applied via syrup is applied via atomized molten spray application.

EXAMPLE 19

The following program was used:

|  | PHASE | | | | | | | | | | |
| --- | --- | --- | --- | --- | --- | --- | --- | --- | --- | --- | --- |
|  | 1 | 2 | 3 | 4 | 5 | 6 | 7 | 8 | 9 | 10 | 11 |
| Repetitions | 2 | 2 | 3 | 3 | 2 | 3 | 2 | 2 | 5 | 1 | 1 |
| Syrup Dose (kg) | 16 | 22 | 27 | 27 | 17 | 30 | 28 | 17 | 28 | 12 | 9 |
| Molten Dose (kg) |  |  |  | 26 |  | 22 |  |  |  |  |  |
| Flavor Dosing |  |  |  |  | Yes |  |  | Yes |  |  |  |
| Pause Time (min.) |  |  |  | 0.2 |  | 0.3 | 0.5 |  | 0.5 | 0.8 | 1.5 |
| Dry Time (min.) | 2.5 | 2.7 | 3.2 | 1.7 | 2.5 | 1.5 | 2.0 | 2.5 | 2.5 | 3.0 | 3.0 |
| Air Temp. (° C.) | 26 | 28 | 28 | 28 | 28 | 26 | 28 | 28 | 26 | 24 | 24 |
| RPM | 5 | 6 | 6 | 7 | 6 | 7 | 7 | 7 | 7 | 8 | 8 |
| Syrup Conc. (Brix) | 74 | 74 | 74 | 74 | 74 | 74 | 72 | 72 | 72 | 72 | 72 |

| Ingredient | Increased Tahla Syrup #1 | Syrup #2 |
| --- | --- | --- |
| Xylitol | 470 kg | 468 kg |
| Gum Tahla (40%) | 275 kg | 53 kg |
| Titanium Dioxide | 4.2 kg | 5.0 kg |
| Water | 20 kg | 123 kg |

|  | Solids (kg) | Experimental | Original |
| --- | --- | --- | --- |
| Syrup #1 | 261.2 | 44.1% | 40.7% |
| Syrup #2 | 175.7 | 29.6% | 59.3% |
| Molten | 156.0 | 26.3% |  |
| Total | 592.9 | 100.0% |  |

The overall process time was 1 hour and 58 minutes. The following were also used in this trial:
Menthol chewing gum pellet centers
Typical grossing syrup was used for Syrup #1
(12.4% gum tahla, 74° Brix)
Typical smoothing syrup was used for Syrup #2
(4.8% gum tahla, 720 Brix)
Fan-shaped internal mix atomizing air spray nozzles
Atomizing air flow rate=90 liters/min/nozzle at 200° C.
Molten xylitol spray rate was slowed back to 320 g/min/nozzle
Reversed molten-syrup applications for 25 kg molten doses A newer streamlined dosing strategy was used successfully during this batch. The phase cycles were Molten-Syrup-Shortened Dry. Syrup doses were found to dry much more quickly and thoroughly when dosed after typical molten doses. This was likely due to the latent heat remaining in the bed following a molten dosing spray. Thus, the overall cycle time could be reduced by reversing the molten and syrup dosing as was accomplished during this batch. The molten spray rate was gradually increased in order to reduce total coating time, for example, from 310 g/min/nozzle to 430 g/min/nozzle during Phase 5. A molten spray rate of 430 g/min/nozzle was used during Phase 7. High target pellet weight following the 1st Flavor resulted in a reduction of molten dosing during Phase 7 from 26 kg/cycle to 22 kg/cycle. The syrup dose increased from 27 kg to 30 kg during Phase 7 to address pellet smoothness. This could likely be extended further in future process refinement efforts. Pellets were produced with fairly good corners and reasonably smooth finish in 1 hour and 58 minutes. This batch represented the best appearing pellet with respect to good corners and acceptable smoothness in under 2 hours.

In contrast to Example 10, the molten cycles for Example 19 used an application protocol of "molten-syrup-pause-dry." "Dry" was reverse air; "molten" was direct air. This protocol could be used to full advantage to shorten the overall cycle time due the sensible heat transfer resulting in warming of the pellet bed following molten polyol spray application in conjunction with the very dry, slightly porous matrix structure of the crystalline polyol on the pellet surface following the molten polyol spray. Subsequent application of the polyol syrup to the pellet centers following molten spray results in much more rapid drying of moisture, or alternatively the opportunity to apply considerably greater doses of syrup than would be normally accommodated during a conventional "syrup-pause-dry" protocol in the absence of molten polyol.

A summary of the general coating process values from ten trials is shown below:

|  | Coating Time (Minutes) | Average Finished Pellet Weight (g) | Approximate Molten Composition (% Coating Weight) |
| --- | --- | --- | --- |
| Example 10 | 122 | 1.438 | 32.7 |
| Example 11 | 126 | 1.415 | 31.4 |
| Example 12 | 143 | 1.471 | 22.0 |
| Example 13 | 160 | 1.493 | 30.0 |
| Example 14 | 135 | 1.476 | 26.1 |
| Example 15 | 135 | 1.478 | 21.5 |
| Example 16 | 130 | 1.483 | 25.1 |
| Example 17 | 132 | 1.507 | 28.1 |
| Example 18 | 130 | 1.503 | 21.3 |
| Example 19 | 118 | 1.462 | 26.2 |

It appears that best results were typically achieved when several (3-4) applications of Syrup #1 was completed prior to the first molten xylitol application. Usually, all molten applications were completed prior to 2nd flavor, and all phases following 2nd flavor used Syrup #2 for smoothing. Using this approach, final pellet coatings of acceptable smoothness were achieved. However, the gum pellets generally displayed an unacceptable washing of corners. For example, the corners of the original gum pellet were not retained.

To address the loss of corners, or washed corner, problems which had been associated with many of the previous molten batches, several conventional layers of gum-containing syrup were applied to bind the initial corners on the pellets. Molten xylitol and gum-containing syrup was intermittently applied to build the coating and the gum concentrations in the syrups applied was increased during the molten xylitol coating sequences.

For example, the later experimental batches successfully used more Syrup #1 sprays prior to the first applications of molten xylitol and also continued the use of Syrup #1 up until the 2nd Flavor. This approach provided very strong corners, for example the corner shapes were retained, due to the significant use of tahla-based syrups earlier in the process, delayed application of molten dosing until just prior to 1st Flavor, alternation of molten and syrup dosings between 1st and 2nd Flavor, and extending the use of Syrup #1 until the beginning or 2nd Flavor. All phases following 2nd Flavor used Syrup #2 and were used for effective smoothing of pellets without the notable loss of corners observed during earlier trials.

For long-term adhesion of the molten xylitol layer to gum centers, the process included spraying and drying several coating layers of tahla-containing syrup on pellets prior to the initial molten spraying. Further, molten spray applications were done with very low molten doses for each syrup dose while increasing the amount of molten applied as the coating thickness builds.

To avoid melting, softening or deforming of the gum centers upon the higher spraying rate of molten xylitol on bare pellet centers early in the coating process, the spray rate of molten xylitol on the pellets was reduced with little or no coating shell build upon the surface. After the coating layer thickness increased, a greater spray rate of molten xylitol was applied. Coating of hard candies, mints, or other thermally stable substrates that would typically be refractory to thermal deformation would not need to utilize this modified molten application procedure. High rate application of molten polyols onto very firm or chilled confectionery centers could be easily accommodated in other process protocols.

The development of large, friable crystals with sandy texture within the molten xylitol coated layer in the finished coated product was avoided by intermittently applying dry molten xylitol with conventional syrup-based polyol solution to continually dissolve and recrystallize the dry molten layers. In addition, syrup drying times following molten xylitol application could be increased by using porous, dry pellet surfaces which absorbs moisture from subsequently applied syrup dosages and speeds surface drying and hardening of pellet coatings.

Improved surface smoothness and dryer, porous pellet appearance was produced using a fine atomization of molten xylitol on the pellet bed. Finely atomized spraying of molten xylitol resulted in a cloud, dust or mist of fine xylitol droplets and particles which adhered to the pellet surface after exiting the spraying nozzle.

The installation of the rotameter for the regulation of the atomization air was a modification to the equipment configuration. This permitted for the first time the setting of atomization airflow rate to a desired value. Peeling and flaking of the early pellet coating was observed during the first several batches completed using the cone-shaped nozzle tips. This was determined to result from the higher atomizing airflow rate used during these early trials. The increased atomization airflow was an attempt to minimize atomizing air flow fluctuations and spitting observed at lower airflow rates and to improve the atomized xylitol spray pattern of the cone-shaped nozzle tips. An improved atomization pattern resulted from higher per nozzle airflows, for example, above 3.5 $ft^3$/min/nozzle. The rotameter and regulator permitted dialing down of atomizing airflow to the desired 2.5 $ft^3$/min/nozzle.

Figure 3:
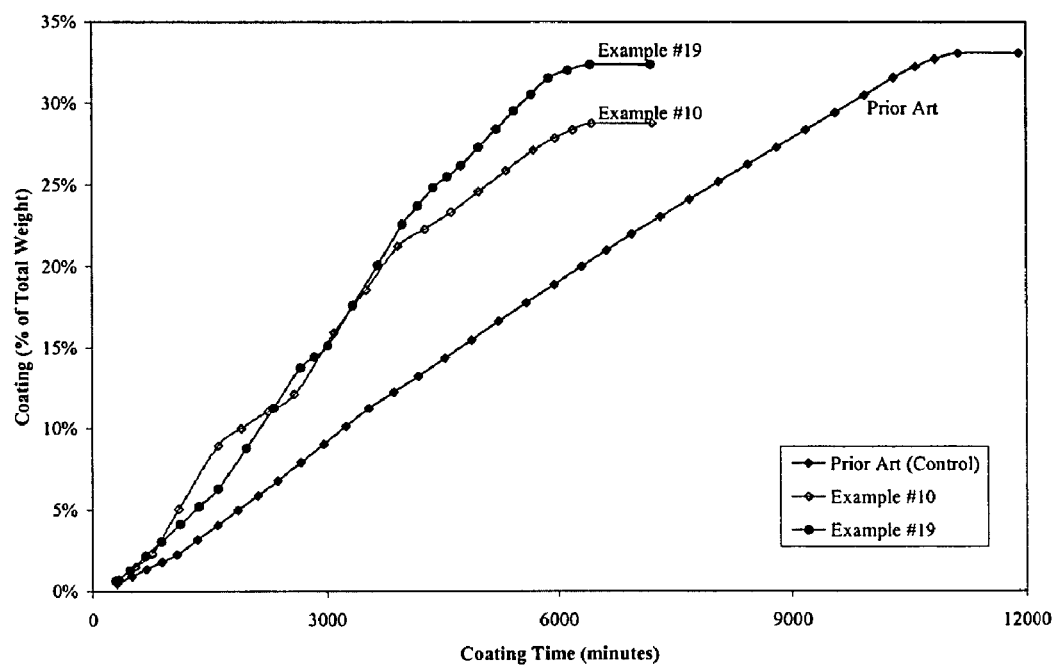
FIG. 3 illustrates graphically the results of Experiment #10 and Experiment #19 showing the improved process times of the present invention.

A schematic representation comparing representative molten processes with the conventional xylitol syrup process is shown in FIG. 3. This graph displays differences and similarities in how pellet coating mass is applied and accumulated between the molten processes and conventional process in order to reduce the overall coating time by approximately 40% while maintaining flavor additions and total coating material applied.

In one embodiment, features of the recommended molten process include, for example extended use of Syrup #1 to 2nd Flavor to maintain corners, use of molten building phases immediately before and after 1st Flavor, conservative 300-450 g/min/nozzle molten application rate used (greater than 1000 g/min/nozzle is possible), aggressive build up of coating mass between 26-66 minutes, strong tahla syrup foundation permits good smoothing protocols after 2nd Flavor, observed rapid drying of syrup following molten applications (shorter cycle times), and flavor doses and applications maintained as with the control.

By way of these examples, these trials have demonstrated that a confectionary coating time of less than 2 hours and a 40% reduction in xylitol pellet coating time with manufacturing equipment is feasible and can result from increased productivity and throughput through modification of existing equipment. The resulting 40% reduction in overall coating times for xylitol pellets alone will result in improved throughput and production efficiencies.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method of manufacturing a coated chewing gum comprising the steps of:
   providing a chewing gum center having a shape;
   heating at least one polyol to the polyol's melting point or greater to produce a molten polyol;
   providing a syrup composition of at least one polyol; and
   applying a plurality of layers of the at least one molten polyol and the at least one syrup composition to the chewing gum center to form a coating.

2. The method of claim 1, wherein the application of molten polyol or the syrup composition is repeated any number of times in order to build up the coating.

3. The method of claim 1, wherein the molten polyol is selected from the group consisting of xylitol, maltitol, sorbitol, erythritol, mannitol, isomalt, lactitol and combinations thereof.

4. The method of claim 1, wherein the molten polyol includes a non-polyol ingredient.

5. The method of claim 1, wherein the non-polyol ingredient is selected from the group consisting of sucrose, fructose, maltose, glucose, dextrose, trehalose and combinations thereof.

6. The method of claim 1, wherein the molten polyol is a blend of polyols.

7. The method of claim 1, wherein the nozzle includes an atomizing air flow rate ranging between 0.5 liters/mm/nozzle and 5.0 liters/mm/nozzle.

8. The method of claim 1, wherein the molten polyol is sprayed at a rate ranging between 0.04% coating applied/minute to 2.00% coating applied/minute.

9. The method of claim 1, wherein the temperature of the molten polyol is maintained between about its melting point and 140% of its melting point during the spraying of the molten polyol through the nozzle.

10. A method of manufacturing a coated chewing gum comprising the steps of:
    providing a gum center including a water insoluble gum base, a water soluble portion and one or more flavoring agents;
    applying at least one coating layer to the chewing gum center to form an initial coating, wherein each of the layers comprises a syrup composition;
    drying each layer prior to applying another layer of the syrup composition;
    heating at least one polyol to between about 100% to about 140% of the polyol's melting point to produce a molten polyol, wherein the molten polyol comprises less than 5 percent by weight water;
    applying at least one layer of the molten polyol to the chewing gum center having the initial coating;
    drying the at least one layer of the molten polyol; and
    applying at least one additional layer to form a final coating, wherein the additional layer is selected from the group consisting of the first syrup composition, the molten polyol, a second syrup composition, and a flavoring.

11. The method of claim 10, comprising the step of spraying at least one layer of molten polyol to the confectionary center.

12. A method of manufacturing a coated chewing gum comprising the steps of:
    providing a chewing gum center including a water insoluble gum base, a water soluble portion and one or more flavoring agents;
    heating xylitol to the xylitol's melting point to produce a molten xylitol, wherein the molten xylitol comprises less than 5 percent by weight water;
    spraying the molten xylitol through at least one internal air mixing atomizing spray nozzle; and
    applying a plurality of coats to the chewing gum center, wherein at least one of the plurality of coats includes the molten xylitol and at least another one of the plurality of coats includes a syrup composition.

13. The method of claim 1, further comprising spraying the molten polyol through at least one internal air mixing atomizing spray nozzle.

14. The method of claim 13, wherein the nozzle comprises a cone-shaped tip.

15. The method of claim 13, wherein the nozzle comprises a fan-shaped tip.

16. The method of claim 1, further comprising adding a dry charge of the one or more polyols.

17. The method of claim 16, wherein applying the syrup composition, a dry charge, or the molten polyol may be performed in any sequence using any combination of mass applications, cooling, spreading, and drying.

18. The method of claim 1, wherein the coated chewing gum has a similar shape to the shape of the chewing gum center.

* * * * *